United States Patent [19]

Roman et al.

[11] 4,295,948

[45] Oct. 20, 1981

[54] PHOTOCURABLE ADHESIVE FROM ACRYLIC ACID, ACRYLAMIDE, DIMETHYLAMINOETHYL METHACRYLATE, BENZOPHENONE AND METHYL ETHYL KETONE

[75] Inventors: Alain Roman, Bossey; Pierre Chevreux, St. Jean de Gonvillo, both of France; Manfred Wüst, Dardagny; Jacques Ehretsmann, Conches, both of Switzerland

[73] Assignee: Battelle Memorial Institute, Geneva, Switzerland

[21] Appl. No.: 77,472

[22] Filed: Sep. 20, 1979

Related U.S. Application Data

[62] Division of Ser. No. 605,055, Aug. 15, 1975, abandoned.

[30] Foreign Application Priority Data

Aug. 16, 1974 [CH] Switzerland ...................... 11220/74
Aug. 16, 1974 [CH] Switzerland ...................... 11221/74
Aug. 16, 1974 [CH] Switzerland ...................... 11222/74

[51] Int. Cl.$^3$ ................ C08F 220/56; C08F 220/70; C08F 226/10; B32B 17/10
[52] U.S. Cl. ........................... 204/159.23; 428/442; 428/463; 428/483; 526/208; 526/225; 526/263; 526/307.3
[58] Field of Search ................................... 204/159.23

[56] References Cited

U.S. PATENT DOCUMENTS

| | | | |
|---|---|---|---|
| 2,367,660 | 1/1945 | Agre ............................... | 204/159.23 |
| 2,505,067 | 4/1950 | Sachs et al. .................... | 204/159.23 |
| 2,579,095 | 12/1951 | Sachs et al. .................... | 204/159.24 |
| 2,989,455 | 6/1961 | Neugebauer et al. .......... | 204/159.24 |
| 3,759,807 | 9/1973 | Osborn et al. .................. | 204/159.23 |
| 3,954,584 | 5/1976 | Miyata et al. .................. | 204/159.22 |

*Primary Examiner*—Wilbert J. Briggs, Sr.
*Assistant Examiner*—A. H. Koeckert
*Attorney, Agent, or Firm*—Karl F. Ross

[57] ABSTRACT

A photohardenable adhesive comprising, as a photopolymerizable agent, acrylic acid.

2 Claims, No Drawings

PHOTOCURABLE ADHESIVE FROM ACRYLIC ACID, ACRYLAMIDE, DIMETHYLAMINOETHYL METHACRYLATE, BENZOPHENONE AND METHYL ETHYL KETONE

This is a division of application Ser. No. 605,055, filed Aug. 15, 1975, now abandoned.

The present invention relates to a photohardenable adhesive which can be used to advantage in the fabrication of laminated articles which comprise at least one synthetic resin foil, especially a foil of polyester, polyamide or polylefin, bonded to a substrate of a similar or dissimilar material. More particularly, the substrate can comprise a metal, a metal alloy, a ceramic material, a mineral glass, wood, polyolefins, polyacrylicesters, polymethacrylicesters and polyesters.

The use of such an adhesive permits the solution of certain problems which have been encountered heretofore in the fabrication of laminated articles and also confers on such articles new characteristics which render them clearly superior to articles of similar types which have been produced heretofore.

The fabrication of a laminated article comprising at least one outer layer constituted by a synthetic resin foil bonded to a substrate of a material such as metal, a metallic alloy, a ceramic, a mineral glass, wood or a synthetic resin identical to or different from the foil has been of considerable interest in a number of industrial sectors, especially in the fabrication of composite transparent window structures including safety glass windows which can be used as windshields or the like for automotive vehicles. The composite structures are also of interest in the production of metallic articles having at least one surface coated by a foil or layer of a synthetic resin.

Conventional techniques for the production of such laminated articles have not been fully satisfactory and the properties of the laminated article leave something to be desired in a number of applications of such articles.

Conventional systems generally bond a synthetic resin foil upon a substrate such as a metallic body, particularly a thin metallic foil, or to a ceramic substrate (e.g. a glass plate) by means of an adhesive substance which can consist of an active material dissolved in a volatile solvent or a mixture of substances which harden by chemical reaction.

Such adhesives require, for the most part, a heating of the stack of elements in order to eliminate the solvent or promote the chemical reaction. In the latter case volatile reaction products may be released during the heating operation.

In substantially all cases using conventional adhesives of these types, the complete hardening of the adhesive cannot be obtained in a reasonable period of time and requires several hours in certain cases. Furthermore, the thermal action itself may cause deterioration of the substances or components to be bonded together.

It is thus apparent that it would be highly advantageous for industrial purposes to provide an adhesive which can effectively bond in a substantially shorter period of time, i.e. requires less time to harden, and which does not require heat as is the case with conventional adhesives. Furthermore, it is highly desirable to avoid any evolution or release of substances such as gases during the hardening process.

To eliminate these disadvantages of conventional adhesives, it has been proposed to provide a photopolymerisable adhesive, especially a mixture of at least one unsaturated polyester, at least one ethylenically unsaturated monomer capable of copolymerizing with the polyester, and at least one photochemical polymerization intiator. Such a composition is, for example, described in published French patent applications Nos. 2,001,985, 2,079,275 and 2,124,422.

The use of such adhesives compositions has been found to be effective and to possess considerable advantages over the aforementioned traditional adhesives in the production of laminated articles as mentioned above, for example in article comprising at least one synthetic resin foil bonded to a substrate.

However, from the point of view of the properties of the article obtained, neither the traditional types of adhesives nor the photopolymerizable adhesive compositions known heretofore are completely satisfactory.

In practice it is found that the adhesive forces by which the synthetic resin foil is bonded to a metal or to a ceramic material such as glass which are obtained with the use of the so-called traditional adhesives or the conventional photopolymerizable adhesive compositions, are relatively weak and in general can be less than 300 grams per $cm^2$.

Furthermore, even such values are considerably reduced in certain cases and may disappear entirely in a nonreversible manner when the article is subjected to heat. This is obviously a significant disadvantage in certain applications of the laminated body, e.g. in fields which require sterilization of the article or cleaning at high temperatures.

The reduction in the adhesive force as a result of heating makes it practically impossible to thermally bond two articles of a laminated type using either the traditional adhesive or the conventional photopolymerizable adhesive, e.g. two laminated foils, so that this too is an obstacle to the applications of such adhesives and articles utilizing same in the industrial sector.

The present invention has as its principal object the provision of a photohardenable adhesive particularly adapted to bond a polymeric resin capable of transmitting ultraviolet radiation to the surface of a substrate with a substantially higher adhesion force than can be obtained with either the traditional adhesives or the photopolymerizable adhesives known heretofore.

We have discovered that this object, and others which will become apparent hereinafter, can be readily attained by the provision of a photopolymerizable composition based upon acrylic acid.

In a first formulation, this composition can consist of at least 98% by weight of acrylic acid. Such a composition has been found to be particularly advantageous where the foil to be bonded is a polyamide.

When the foil to be bonded to the substrate is a polyester, the composition (second formulation) preferably consists of a homogeneous mixture of acrylic acid and at least one photosensitizing compound of the free radical initiator type activatable by electromagnetic radiation of a wavelength at least equal to 0.3 microns.

A third formulation which has been found to be particularly of advantage in the case in which the foil to be bonded to the substrate is a polyolefin, a polyacrylic ester or a polymethacrylic ester or a polyamide, comprises a photopolymerizable composition consisting of a homogeneous mixture of acrylic acid and at least one aromatic ketone having the general formula $R_1$—

CO—R$_2$, where R$_1$ is a monovalent group selected from the group which consists of phenyl and methylphenyl and their halogenated and methyl-substituted derivatives and R$_2$ is a monovalent group selected from the group which consists of phenyl and methyl, halophenyl and methyl-phenyl. The halogen derivation which may be used according to the invention are the fluorophenyl, chlorophenyl and bromophenyl compounds and substantially any number of methyl group may be substituted on the aromatic nucleus.

The first formulation of the photohardenable composition permits bonding an element, e.g. a foil, of a polyamide resin which is transparent to ultraviolet radiation, to the surface of a substrate, especially a metallic substrate or a ceramic substrate, with an adhesive force far in excess of that obtainable with conventional adhesives and which practically does not change with heating of the laminated article which is produced, even when the temperature is raised to the softening point of the polyamide resin. In this first formulation, the composition can comprise, in addition to the acrylic acid, a small quantity of a polymerization catalyst for example azobisisobutyronitrile, this quantity being at most equal to 2% by weight of the composition.

In the second formulation of the photopolymerizable composition, it is possible to use, as the photosensitization compound, for example, one of the following compounds: naphthalene sulfochloride, benzoin, chloro-2-anthraquinone, ethyl-2-anthraquinone, carboxy-2-anthraquinone acid, the (alpha acetoxy-ethyl)-2-anthraquinone and the diethyl-2,5-aminophenyl-oxidiazole-1,3,4. The napthalene sulfochloride, however, is preferably used.

Best results are obtained with a composition in which the photosensitizing agent makes up 0.5 to 10% by weight of the total photopolymerizable composition.

Apart from the acrylic acid and the photosensitizing compound, the second composition formulation can include at least one methacrylic acid ester, preferably the dimethylamino-ethyl-methacrylate, the tertiary-butyl-amino-ethyl-methacrylate, or the diethylamino-ethyl-methacrylate. Preferably the proporation of this ester of methacrylate acid is at most equal to 15% by weight of the total photopolymerizable composition.

The photopolymerizable composition can also include (in the second formulation) at least one amide selected from the group which consists of acrylicamide or methacrylic amide. Preferably the total amide concentration (the amides being present individually or together) is at most equal to 15% by weight of the photopolymerizable composition.

Thus the proportions of the ingredients constituting the second formulation of the photopolymerizable composition can be found in the following table (percents by weight):

TABLE 1

| acrylic acid | 65-99.5 |
|---|---|
| naphthalene sulfochloride | 0.5-10 |
| dimethylamino-ethylmethacrylate | 0-15 |
| acrylic amide | 0-15 |

A particular advantageous photopolymerizable composition according to the second formulation and one which gives particularly interesting results when utilized as an adhesive is (all percents by weight):

TABLE 2

| acrylic acid | 83 |
|---|---|
| naphthalene sulfochloride | 2 |
| dimethylamino-ethylmethacrylate | 10 |
| acrylic amide | 5. |

In the third formulation of the photopolymerizable composition of the present invention, the ketone is an aromatic ketone of the formula R$_1$—CO—R$_2$ as described above. The most suitable ketones are selected from the group which consists of: benzophenone, chloro-4-benzophenone, deoxybenzoin, dimethyl-4,4'-benzophenone and acetophenone. Preferably benzophenone or chloro-4-benzophenone can be used. The ketone appears to play a role as a photosensitizer which increases the adhesion of the acrylic acid to polyolefin resins or polyacrylic or polymethacrylic esters to yield a substantially higher adhesion value for such foils when the latter are bonded to a substrate. In the absence of such a ketone it is possible to bring about a complete photopolymerization of the acrylic acid with ultraviolet irradiation in several seconds without obtaining a material adhesion of the adhesion to a foil of polyolefin resin or polyacryllic ester resin or to the substrate.

The aromatic ketone should be present in an amount between 0.5 and 10% by weight with respect to the total quantity of the acrylic acid and aromatic ketone mixture. These proportions yield the highest adhesion values. It should be noted that beyond 10% by weight of the aromatic ketone, the adhesive force diminishes, all other things being equal.

In this third formulation, the photopolymerizable compositions can contain, in addition to the acrylic acid and the aromatic ketone, at least one aliphatic ketone having the formula R$_3$—CO—R$_4$ in which R$_3$ and R$_4$ can be identical or different and each represents a group of the formula C$_n$H$_{2n+1}$, where n is a number at most equal to 4. Best results are obtained when the aliphatic ketone is acetone, methylethylketone, diethyl-ketone, ethyl-propylketone or ethyl-butylketone. We have found that, of these aliphatic ketones, the best performance is obtained with methylethyl-ketone.

The aliphatic ketone appears to play the role of regularizing the adhesive properties of the composition, i.e. it eliminates the variations observed, as a function of the condition of use, between the values of the adhesive forces for a polyolefin resin foil or a polyacrylic ester or polymethacrylic ester resin foil to a substrate with use of the same photoadhesive composition. Preferably the aliphatic ketone is provided in the proportion between 1% and 65% by weight of the total photopolymerizable composition.

In a first variant of this third formulation of the photopolymerizable composition, particularly suitable for the bonding of a polyolefin foil or a polyacrylic ester or polymethacrylic ester foil to a substrate with an elevated adhesive force, which is not able to avoid a temporary reduction in the force in a reversible manner upon heating of the article in a moist environment (e.g. in the presence of boiling water or superheated steam) the photohardenable adhesive includes, apart from acrylic acid, the aforementioned aromatic ketone and the above mentioned aliphatic ketone, at least one heterocyclic compound selected from the lactams of the formula HN—(CH$_2$)$_m$—CO, where m is a number equal to 3, 4 or 5, and derivatives of such lactams obtained by substituting at least one methyl group on at least one of the —CH$_2$—groups of the lactam and/or substituting a methyl or vinyl group on the —NH— group of the lactam. As the heterocyclic compound having the aforementioned formula, it is possible to use, for example, N-vinylpyrrolidone-2, M-methyl-pyrrolidone-2, N-vinyl-piperidone-2, epsilon caprolactam, methyl-5-pyrrolidone-2, trimethyl 3,3,5-pyrrolidone-2 or methyl-3-pyrrolidone-2. Preferably N-vinylpyrrolidone-2 is used. The heterocyclic compound can be used in a proportion between 0.5% and 10% by weight with respect to a total polymerizable composition of the third formulation.

The proportions of the ingredients in the third formulation according to the invention, in its first variant, are represented in the following table (all percents by weight):

TABLE 3

| acrylic acid | 15–98 |
|---|---|
| methylethyl ketone | 1–65 |
| benzophenone | 0.5 to 10 |
| N-vinyl-pyrrolidone-2 | 0.5 to 10 |

Of this first variant of the third formulation, best results have been obtained with the following composition (all percents by weight):

TABLE 4

| acrylic acid | 41 |
|---|---|
| benzophenone | 2 |
| N-vinyl-pyrrolidone-2 | 2 |
| methylethyl ketone | 55 |

According to another variant of the third formulation of the photopolymerizable composition, which permits bonding of a foil of polyolefin resin or of a polyacrylic or polymethacrylic ester to a substrate with an elevated adhesion force, comprises, in addition to acrylic acid, the aromatic ketone and the aliphatic ketone, at least one methacrylate selected from the group which consists of dimethylaminoethyl methacrylate, diethylaminoethyl methacrylate, and tertiary-butylaminoethyl methacrylate, and at least one amide selected from the group which consists of acrylamide and methacrylamide. In this variant, heating in boiling water or in superheated steam of the laminated article produces no reduction of the adhesive force. Preferably the methacrylate and the amide are each present in an amount between 5% and 35% by weight with respect to the total weight of the photopolymerizable composition.

Thus the proportional limits of the ingredients in this second variant of the third formulation of the photopolymerizable composition can be (all percents by weight):

TABLE 5

| acrylic acid | 15–88.5 |
|---|---|
| acrylicamide | 5–35 |
| methylethyl ketone | 1–6 |
| benzophenone | 0.5–10 |
| dimethylamino ethyl methacrylate | 5–35 |

A composition in accordance with the second variant of the third formulation which provides particularly interesting and desirable results as an adhesive is (all percents by weight):

TABLE 6

| acrylic acid | 37 |
|---|---|
| benzophenone | 3 |

TABLE 6-continued

| methylethyl ketone | 15 |
|---|---|
| dimethylamino ethyl methacrylate | 20 |
| acrylicamide | 25 |

The second variant of the third formulation, in addition, has the advantage over the first variant in that it provides a particularly good adhesion force for the bonding of the polyolefin resin structure to a polyester resin structure.

The present invention also relates to the use of the photohardenable adhesive for the production of laminated articles comprising at least one surface layer permitting the transmission of ultraviolet radiation.

This use according to the invention involves the assembly of at least two structural elements, at least one of which permits the transmission of ultraviolet radiation, with interposition of a layer of adhesive between the two elements and positioning the elements to permit irradiation of the adhesive through the ultraviolet-transparent element. The irradiation consists at least in major part of electromagnetic radiation in the ultraviolet portion of the spectrum. Irradiation is carried out for a time sufficient to polymerize the adhesive composition.

The polymerization generally takes place with a very short irradiation period (for example between 0.5 seconds and 1 minute depending upon the energy of the radiating source) with strong mutal adhesion of the structural elements constituting the laminated articel. For example, in the case of a laminated article constituted by a polyamic resin foil having a thickness of 40 microns and bonded to a metallic substrate or a ceramic substrate by means of the adhesive according to the invention, the adhesive force, measured by the standard T peel test described in ASTM D 1876-69 standard is able to reach 1,000 to 1,050 grams per cm. Such a value corresponds to the strength of the polyamide foil at rupture. In the case of a polyamide foil having a thickness greater than 40 microns, the adhesive force measures substantially higher than 1,000 grams per cm.

When the first formulation is used, e.g. to bond a foil of a polyamide resin to a substrate, the adhesive force manifests a temporary reduction, generally of the order to 20% to 60% of its initial value, upon heating the laminated article in a humid environment, for example by immersion of the article in boiling water or by disposing it in an atmosphere of superheated steam, for example at 117° C. The adhesive force, however, returns to a value at least equal to its initial value upon removal of the laminated article from the elevated temperature environment and placing it in ambient atmosphere.

A laminated article constituted by a polyamide resin foil bonded to a metallic substrate with the adhesive according to the first formulation mentioned above can be subjected to thermal welding in the usual manner without the adhesive force between the polyamide resin foil and the substrate diminishing upon the application of heat necessary to obtain the partial fusion of the polyamide resin during the thermal welding.

As the substrate, it is possible to use a metal in the form of a foil, a plate or a massive body, or a ceramic material such as glass, porcelain etc. A substrate of another material such as wood or synthetic resin may be used as described below. The wood should have a smooth surface such as that of wood which has been planed or varnished.

The articles which can be fabricated according to the invention can be laminated in various forms with, for example, a plurality of resin foils (polyamide) and/or one or more substrate layers with interposition of the polyamide resin foils between the substrate layers and with interposition of the adhesive between the foil layers and between the foil layers and the substrate layers or between the foil layers. The only condition necessary in accordance with the invention is the possibility of radiating the adhesive layer or layers by ultraviolet radiation.

The duration of radiation necessary to obtain polymerization of the adhesive is, of course, a function of the radiation dosage received by the adhesive. The radiation dosage is, in turn, a function of the power of the radiating source, the distance between this source and the adhesive and the transmission coefficient of the material or materials interposed between the radiation source and the adhesive.

The radiation source for subjecting the adhesive layer to ultraviolet irradiation can be a mercury vapor lamp having a power at least equal to 20 watts and this power can exceed 10 kilowatts.

Thus, for example, it is possible to use a mercury vapor lamp having the power of 125 watts placed at a distance of 7 cms from the acrylic acid adhesive layer, the latter being interposed between a polyamide foil having a thickness of the order of 40 microns and a metallic substrate, the adhesive being at ambient temperature.

While it is possible to obtain a high adhesive force while maintaining the adhesive at ambient temperature during and after irradiation, it has been found advantageous to bring the adhesive, during irradiation, to a temperature between 80° C. and 140° C. All other conditions being equal, the use of a slightly elevated temperature provides a greater adhesive force bonding the foil to the substrate. In general one is able to obtain a higher limit of the variation of the adhesive force, as a function of the irradiation time, than is the case when one maintains the adhesive at ambient temperature during irradiation. The highest adhesive force can be obtained by a period of irradiation with ultraviolet light followed by subjecting the adhesive layer, after irradiation, to a temperature at least equal to 80° C. and at most equal to 140° C. for a period at equal to five minutes and at most equal to eighty minutes. (For a period of less than five minutes following ultraviolet irradiation the improvement upon the adhesive force is very weak and the invention is impossible to practice. For a period in excess of eighty minutes, one can observe, as a function of this duration, a slight reduction in the adhesive force which then stabilizes at a value about 10% to 15% less than the maximum value of the adhesive force). Thus one can advantageously combine a heating of the adhesive during irradiation with a heating of the adhesive after irradiation with ultraviolet energy.

It should be noted that a heating of the adhesive before irradiation has no effect on improvement of the adhesive force for the radiation period. Consequently, a simple heating of the adhesive without irradiation does not produce the requisite polymerization.

In order to maintain the adhesive, during or after ultraviolet irradiation, at the desired temperatures mentioned above, it has been found to be particularly advantageous to use an infrared radiation source. In the case of heating during radiation it is possible to use the infrared radiation emitted by the ultraviolet source. Of course it is possible to use another heating means such as a heating plate or coil, a furnace, or an ultrasonic generator, or a current of hot gas.

The thickness of the adhesive layer expressed in units of weight per unit of surface area should be between 0.3 and 5 grams per m$^2$ although the latter limit can be exceeded if desired. The best results from the point of view of the adhesive force, especially for retention of the adhesive force during sterilization of the laminated article, can be obtained with a thickness of 1 gram per m$^2$. It should be noted that the irradiation period required to obtain a given value of the adhesive force increases as a function of thickness of the adhesive layer until the latter thickness reaches a level above 5 grams per m$^2$.

Using the second formulation of the photopolymerizable composition to bond a foil of polyester to a substrate, the adhesive according to the invention permits obtaining very high levels of the adhesive force with very short periods of irradiation (between for example 0.5 and 30 seconds depending upon the power of the radiation source and its spectral emission characteristics). The values of the adhesive force, measured by standard testing (T peel test as described in ASTM standard D 1876-69,) can reach 1000 grams per cm. This value does not diminish except temporarily when the laminated article is immersed in boiling water or maintained in an atmosphere of superheated steam, for example at 117° C.

As the substrate, it is possible to use a metal or metal alloy in the form of a foil, plate, massive article, or a ceramic material such as glass or porcelain. It is also possible to use a substrate such as wood, polyolefin resin, polyacrylic ester, polymethacrylic ester or a polyamide.

Articles of all shapes can be provided with, for example, one or more foils of polyester resin and one or more layers of substrate with interposition of the foils of polyester resin and the layers of substrate. The only condition necessary in producing such articles is the requirement that it be subject to irradiation of the intermediate layers of adhesive by ultraviolet light which, therefore, should be able to pass through the surface layer. Either the resin foil or the substrate must thus be constituted by a material permitting the transmission of ultraviolet radiation of a wavelength at least equal to 0.3 microns.

It has been found to be immaterial whether the adhesive layer is applied to one or the other of the juxtaposed faces of the foil or the substrate or whether the adhesive layer is applied to both faces. The application can be made manually, for example, by means of a pad impregnated with the photopolymerizable composition or with the aid of any appropriate mechanical device.

In the case of the second formulation, the thickness of the adhesive layer, expressed in units of weight per unit of surface area, can be between 1 and 20 grams per m$^2$ although it is able to exceed the latter limit. Best results from the point of view of adhesive force, especially as concerns the adhesive force during sterilization of the laminated article, can be obtained with a thickness of the adhesive corresponding to 5 and 10 grams per m$^2$.

The duration of irradiation necessary to bring about polymerization of the adhesive of the second formulation corresponds to the minimum radiation dosage of the appropriate wavelength absorbed by the adhesive layer. It varies as a function of the power of the radiation source and its spectral distribution, and of course, as a function of the distance between the source and the adhesive layer and the transmissivity to the radiation of the layer interposed between the radiation source and the adhesive layer.

As described previously, any electromagnetic radiation source whose emission spectrum has or consists at least in major part of the wave lengths above 0.3 microns, for example a mercury vapor lamp, can be used. Preferably one or more vacuum vapor lamps having a power between 20 watts and 10 kilowatts may be employed.

For example, a mercury vapor lamp having a nominal power of 2 kilowatts, such as the mercury vapor lamp HTQ 7 of PHILLIPPS or another mercury vapor lamp having a nominal power of 5 kilowatts such as the high pressure mercury vapor lamp marketed under the trade name HANNOVIA supplying an energy of 80 watts per cm, can be used with advantage.

When the second formulation of the photopolymerizable composition according to the invention is used, it is preferred to carry out irradiation without subjecting the assembly to heating other than that which results from the calorific heat energy emitted by the radiation source. However it is not necessary to cool the assembly to dissipate all or part of the thermal energy received by the irradiated object.

When the third formulation of the photopolymerizable composition according to the invention is used to bond a foil of a polymeric resin selected from the group which consists of polyolefins, polyacrylic esters, or polymethacrylic esters, to a substrate, a relatively short duration between one second and thirty seconds of ultraviolet irradiation will suffice, depending upon the power of the radiation source and its emission spectrum. This irradiation period gives an extremely high adhesive force between the foil or the foils of polyolefin or polyacrylic or polymethacrylic ester to the substrate. The force of adhesion, measured as described above, can be 1200 to 1400 grams per cm². These values do not diminish even in the case in which the assembly is subjected to heating in a humid environment. Any slight diminution is merely temporary when one immerses the assembly in boiling water or subjects it to an atmosphere of superheated steam for example at a temperature of 117° C.

An important feature of the invention is that the laminated articles obtained by using the adhesive according to the invention can be subjected to thermal welding in conventional manner without significant reduction of the adhesive force between the foil and the substrate.

Here again the substrate can be a metal or metallic alloy in the form of a foil, a plate or a massive body, or a ceramic material such as glass or porcelain. A substrate of wood, polyolefin resin, polyacrylic or polymethacrylic ester or a polyester resin may be used.

Furthermore, one or more foils of the polymeric resin and one or more substrate layers may be interleaved with intervening layers of adhesive as long as the latter can be subjected to irradiation through the surface layers of foil or substrate by ultraviolet energy.

For the third formulation the thickness of the adhesive layer should be between 1 and 20 grams per m² or in excess of the latter limit. Best results are obtained when the thickness is between 5 and 10 grams per m², especially where the laminated article is to be subjected to sterilization.

In the case of the third formulation also, the radiation period necessary to obtain polymerization is a function of the wavelength of the source and the wavelength of the energy received by the adhesive layer. It varies as a function of the power and spectral distribution of the radiation source and as a function of the distance between the source and the adhesive layer and the transmissivity of the material interposed between the adhesive layer and the source to ultraviolet radiation.

The radiation source for polymerization of the adhesive layer of the third formulation can be any electromagnetic radiation source whose emission spectrum is constituted at least in major part by a spectral range between 0.25 and 0.28 microns wave length. For example the radiation source may be a mercury vapor lamp. Preferably one or more lamps having a power between 20 watts and 2 kilowatts may be used and specific mention may be made of the PHILLIPPS and HANNOVIA lamps identified above. Preferably the irradiation of the third formulation is carried out without heating other than that which results from the thermal emission of the radiation source. As noted previously it is not necessary to cool the assembly to dissipate all or part of the thermal irradiation.

Assembly of the stack or laminate can be carried out continuously or discontinuously.

In the continuous mode of operation according to the invention, a transparent foil of polyolefin resin or a foil of polyacrylic or polymethacrylic ester is coated with the adhesive or the adhesive is coated onto a metallic substrate and the faces of the foil and substrate are brought together with a layer of adhesive between them. Of course, both faces may be coated with the adhesive. As the two faces are juxtaposed and the foil and substrate are brought together, the assembly may be passed in the path of ultraviolet radiation from an appropriate source as described above. The speed with which assembly is moved past the source is selected to give the necessary period of irradiation to obtain the desired level of the adhesive force, e.g. an adhesive force at least equal to 600 grams per cm². This insures that the assembly will not be excessively heated before it leaves the region of the irradiation source. The temperature of the adhesive may thus be held below the boiling point of acrylic acid under atmospheric pressure (141.3° C.).

When the thickness of the polyamide resin foil is of the order of 30 to 40 microns, using a radiation source in the form of a mercury vapor lamp having a power of 5 kilowatts 14 cms from the surface of the resin foil, an optimum adhesion and degree of polymerization is obtained when the assembly is passed through the ultraviolet beam at a rate of 7.5 m per minute and with a radiation exposure time of 1.5 seconds.

The invention also includes the laminated article obtained by the use of the adhesive described above.

The article can be of a variety of forms although it should comprise a surface layer permeable to ultraviolet radiation which is bonded to a substrate through a hardenable layer of the photopolymerizable adhesive described above. The surface layer can be, for example, constituted by a synthetic resin foil selected from the group which consists of polyamides, polyesters, polyolefins, polyacrylic esters and polymethacrylic esters and especially the polyamide obtained by homocondensation of amino-11-undecanoic acid. The surface layer can also be constituted by a glass plate of roganic or mineral glass or any other transparent material capable of being bonded to an appropriate substrate by means of the adhesive according to the invention with a sufficient adhesive force.

The substrate can be constituted by a metallic foil which is flexible or stiff or by a plate of glass or film of polyester.

While all of the possible embodiment of laminated articles according to the invention need not be described in detail, the following have been found to be particularly desirable:

a laminated article consisting of a synthetic resin foil, especially a foil of polyester, polyolefin, polyacrylic or polymethacrylic ester or a polyamide foil (preferably a polyamide obtained by homocondensation of amino-11-undecanoic acid), having a thickness of the order of 30 to 100 microns bonded by a hardenable adhesive layer according to the invention to the surface of a metallic substrate such as aluminum with a thickness of the order of 50 to 250 microns. A laminated article of this type can have two synthetic resin foils bonded each to one of the faces of the substrate for industrial purposes and in the food trades.

An article laminated from a plate comprising two layers of mineral glass, each having a thickness of 0.5 mm, adhered together by a photopolymerizable adhesive layer disposed between them. An article of the latter type can be used as safety glass for automotive vehicles.

An article laminated from a plate comprising a synthetic resin foil selected from the group which consists of polyesters, polyolefins, polymethacrylic esters, bonded by a photopolymerizable adhesive according to the invention to the surface of the glass plate of mineral glass, for example with a thickness of the order of 0.55 mm.

Articles laminated from a plate consisting of two plates of mineral glass having each, for example, a thickness of the order of 0.5 mm, each bonded to one face of a synthetic resin foil selected from the group which consists of polyolefins, and polyesters having, for example, a thickness of the order of 20 to 100 microns through the intermediary of a photopolymerizable adhesive. This article has been found to be particularly desirable for use as safety glass.

An article laminated from a plate consisting of at least one glass plate bonded to the surface of a metallic substrate which may be a massive body or in the form of a plate or a foil of metal through at least one layer of photopolymerizable adhesive according to the invention.

EXAMPLES 1–33

Various laminated articles are prepared according to the procedures described under the conditions set forth and with the results given in the following tables.

Table I indicates that nature and thickness of the various elements constituting the laminated articles.

TABLE I

| Ex. No. | Nature and Thickness of the Elements constituting the Laminated Articles |
|---|---|
| 1 | Steel plate/adhesive A/polyamide foil (polyhexamethylene adipamide), 40 microns |
| 2 | Same as Example 1 |
| 3 | Same as Example 1 |
| 4 | Same as Example 1 |
| 5 | Same as Example 1 |
| 6 | Steel plate/adhesive A$_1$/polyamide foil (polyhexamide adipamide), 40 microns |
| 7 | Polyamide foil (polyhexamethylene adipamide), 40 microns |
| 8 | Identical to Example 7 |
| 9 | Polyamide foil (polyhexamethylene adipamide) 40 microns/ adhesive A/glass plate 3 mm |
| 10 | Identical to Example 9 |
| 11 | Glass plate 3 mm/adhesive A/polyamide foil (polyhexamethylene adipamide) 40 microns/adhesive A/ glass plate 3 mm |
| 12 | Glass plate 3 mm/adhesive A/glass plate |
| 13 | Steel plate/adhesive B/polyester foil (ethylene polyterephthalate) - 50 microns |
| 14 | Identical to Example 13 |
| 15 | Identical to Example 13 |
| 16 | Identical to Example 13 |
| 17 | Glass plate 3 mm/adhesive B/polyester foil (polyterephthalate of ethylene) 50 microns |
| 18 | Identical to Example 17 |
| 19 | Glass plate 3 mm/adhesive B/polyester foil (ethylene polyterephthalate) 50 microns/adhesive B/glass plate 3 mm |
| 20 | Glass plate 3 mm/adhesive B/glass plate 3 mm |
| 21 | Steel plate/adhesive C/polyethylene foil (high pressure) 50 microns |
| 22 | Steel plate/adhesive C/polyethylene foil (high pressure) 50 microns |
| 23 | Steel plate/adhesive C/polypropylene foil - 75 microns |
| 24 | Steel plate/adhesive C$_1$/polyethylene foil (high pressure) 50 microns |
| 25 | Steel plate/adhesive C$_2$/polyethylene foil (high pressure) 50 microns |
| 26 | Identical to Example 25 |
| 27 | Identical to Example 25 |
| 28 | Steel plate/adhesive C$_2$/polyethylene foil (low pressure) 50 microns |
| 29 | Steel plate/adhesive C$_2$/polypropylene foil - 75 microns |
| 30 | Glass plate 3 mm/adhesive C$_2$/polypropylene foil 75 microns |
| 31 | Identical to Example 30 |
| 32 | Glass plate 3 mm/adhesive C$_2$/polypropylene foil 75 microns/adhesive C$_2$/glass plate 3 mm |
| 33 | Glass plate 3 mm/adhesive C$_2$/glass plate 3 mm |

The adhesive compositions used in Table I are the following:

| | | |
|---|---|---|
| Adhesive A: | Acrylic acid of a quality having a density of 1.06 and consisting of 99.95% by weight of acrylic acid and 0.05% by weight of hydroquinone monomethylether which acts as a stabilizing agent for the acrylic acid with respect to polymerization during storage. | |
| Adhesive A$_1$: | Acrylic acid as described for | |
| | adhesive A | 98% by weight |
| | Azobisisobytyronitrile | 2% by weight |
| Adhesive B: | Acrylic acid as in adhesive A | 83% by weight |
| | Naphthalene sulfochloride | 2% by weight |
| | Dimethylaminoethylmethacrylate | 10% by weight |
| | Acrylamide | 5% by weight |
| Adhesive C: | Acrylic acid as in adhesive A | 41% by weight |
| | Benzophenone | 2% by weight |
| | Methylethyl ketone | 55% by weight |
| | N-vinyl-pyrrolidone-2 | 2% by weight |
| Adhesive C$_1$: | Photopolymerizable adhesive having the following composition: | |
| | Acrylic acid as in adhesive A | 41% by weight |
| | Chloro-4-benzophenone | 2% by weight |
| | Methylethyl ketone | 55% by weight |
| | N-vinyl-pyrrolidone-2 | 2% by weight |
| Adhesive C$_2$: | Acrylic acid as in adhesive A | 37% by weight |
| | Benzophenone | 3% by weight |
| | Methylethyl ketone | 15% by weight |
| | Dimethylaminoethylmethacrylate | 20% by weight |
| | Acrylic amide | 25% by weight. |

TABLE II

| 1 | 2 | 3 | 4 | 5 | 6 | 7 | 8 | 9 | 10 |
|---|---|---|---|---|---|---|---|---|---|
| 1 | 2 kW | 45 | 30 | S | — | 1-3 $\mu$ | 25 | 700 | a |
| 2 | 125 W | 7 | 25 | S | — | 3.6 g/m$^2$ | 120 | 800 | b |
| 3 | 40 W | 1 | 90 | S | — | 1-3 $\mu$ | 110 | 700 | a |
| 4 | 2 kW | 14 | 2.5 | D | 4.5 | 3.6 g/m$^2$ | 25 | 800 | b |
| 5 | 5 kW | 14 | 1.5 | D | 7.5 | 3.6 g/m$^2$ | 25 | 800 | b |
| 6 | 2 kW | 45 | 35 | S | — | 1-3 $\mu$ | 25 | 800 | a |
| 7 | 2 kW | 15 | 120 | S | — | 3 g/m$^2$ | 25 | 800 | b |
| 8 | 2 kW | 15 | 30 | S | — | 3 g/m$^2$ | 25 | 800 | b c |
| 9 | 2 kW | 15 | 120 | S | — | 1-3 $\mu$ | 25 | 1300 | a d |
| 10 | 2 kW | 15 | 180 | S | — | 1-3 $\mu$ | 25 | 1200 | a e |
| 11 | 2 kW | 15 | 120 | S | — | 1-3 $\mu$ | 25 | 1300 | a c |
| 12 | 2 kW | 15 | 180 | S | — | 3 g/m$^2$ | 25 | 65 kg/m$^2$ | b c f |
| 13 | 2 kW | 15 | 20 | S | — | 8 g/m$^2$ | 25 | 500-800 | b g |
| 14 | 125 W | 7 | 25 | S | — | 8 g/m$^2$ | 25 | 500-800 | b g |
| 15 | 125 W | 14 | 1.1 | D | 10 | 8 g/m$^2$ | 25 | 500-800 | b g |
| 16 | 5 kW | 14 | 0.75 | D | 15 | 8 g/m$^2$ | 25 | 500-800 | b g |
| 17 | 2 kW | 15 | 120 | S | — | 1-3 $\mu$ | 25 | 800 | a d |
| 18 | 2 kW | 15 | 180 | S | — | 1-3 $\mu$ | 25 | 700 | a e |
| 19 | 2 kW | 15 | 120 | S | — | 1-3 $\mu$ | 25 | 800 | a c e |
| 20 | 2 kW | 15 | 180 | S | — | 3 g/m$^2$ | 25 | 30 kg/m$^2$ | b c f |
| 21 | 2 kW | 15 | 14 | S | — | 4 g/m$^2$ | 25 | 700 | b |
| 22 | 2 kW | 15 | 14 | S | — | 4 g/m$^2$ | 25 | 700-900 | b |
| 23 | 2 kW | 15 | 14 | S | — | 4 g/m$^2$ | 25 | 1200-1300 | |
| 24 | 2 kW | 15 | 8 | S | — | 4 g/m$^2$ | 25 | 700 | b |
| 25 | 2 kW | 15 | 14 | S | — | 4 g/m$^2$ | 25 | 600 | b |
| 26 | 2 kW | 14 | 4.5 | D | 2.65 | 4 g/m$^2$ | 25 | 700 | b |
| 27 | 5 kW | 14 | 2.8 | D | 3.6 | 4 g/m$^2$ | 25 | 600-800 | b |
| 28 | 2 kW | 15 | 14 | S | — | 4 g/m$^2$ | 25 | 600-800 | b |
| 29 | 2 kW | 15 | 14 | S | — | 4 g/m$^2$ | 25 | 1200-1400 | b |
| 30 | 2 kW | 15 | 120 | S | — | 1-3 $\mu$ | 25 | 1300 | a d |
| 31 | 2 kW | 15 | 180 | S | — | 1-3 $\mu$ | 25 | 1000 | a e |
| 32 | 2 kW | 15 | 120 | S | — | 1-3 $\mu$ | 25 | 1300 | a |
| 33 | 2 kW | 15 | 180 | S | — | 3 g/m$^2$ | 25 | 65 kg/m$^2$ | b c f |

The indicia and significance of Table II are as follows:

Column 1: Example Number.

Column 2: Type of ultravoilet radiation source:

2 kW: Mercury vapor lamp of the high pressure type manufactured by DEUTSCHE PHILLIPS GmbH Type HTQ-7. Total power equals 2 kW; linear power equals 28 watts per cm (the lamp is in the form of a tube having a length of 70 cm and the power is distributed uniformly over this length).

125 W: Mercury vapor lamp of the type HPR 125 W marketed under the mark PHILLIPS and having a power of 125 W.

40 W: Fluorescent lamp having a power of 40 W.

5 kW: Industrial untraviolet lamp having a power of 5 kW and a linear power of 80 watts per cm.

Column 3: Distance expressed in centimeters between the ultraviolet radiation source and the surface of a laminated article.

Column 4: Duration of irradiation in seconds.

Column 5: Regimen of irradiation—

S: Static regimen. The radiation source and the surface of the article are immobile relative to one another during irradiation.

D: Dynamic regimen. The laminated article is moved upon a rolling conveyor past the radiation source during irradiation.

Column 6: Speed of the conveyor in meters per second in the case of a dynamic regimen.

Column 7: Thickness of the adhesive layer before hardening expressed in microns or in grams per m$^2$.

Column 8: Temperature of the laminated article during irradiation.

Column 9: Adhesive force between the elements of the laminated article expressed in grams per cm in the case in which this force is measured by ASTM D 1876-69 standard in accordance with the T peel test, or in kg per cm$^2$ in the case in which the adhesive force is expressed in terms of the rupture of the laminated article during a traction test effected in the usual manner.

Column 10: Remarks:

(a) The adhesive layer is applied by means of a blotter impregnated with the adhesive.

(b) The adhesive layer is applied by means of a graven cylinder.

(c) The laminated article is positioned, during irradiation, upon a polished aluminum plate serving as a reflector.

(d) The irradiation of the adhesive is effected through the polymeric resin foil.

(e) The irradiation of the adhesive is effected through the glass plate.

(f) The rupture of the laminated article takes place in the glass and not in the hardened adhesive.

(g) The rupture of the laminated article takes place by tearing of the polymer resin foil.

EXAMPLE 34

The laminated articles prepared as described are subjected to heating for twenty minutes in superheated steam at a temperature of 117° C. The adhesive force, measured immediately after the treatment and after a period at which the article is maintained at ambient temperature in atmospheric air have the values indicated in Table III.

TABLE III

| Article prepared according to Example No.: | Value of adhesive force immediately after treatment (gram per cm² measured according to ASTM D 1876-69) | Value of adhesive force after maintaining article at ambient temperature and ambient air during a period of 12 to 24 hours grams per cm² measured according to ASTM D 1876-69) |
|---|---|---|
| 1 | 400 | 12 hours: 750-800 |
| 2 | 350-400 | 12 hours: 500-800 |
| 22 | 200-280 | 24 hours: 700-900 |
| 23 | 180-220 | 24 hours: 1050 |
| 28 | 600-700 | 12 hours: 600-800 |
| 29 | 800-1200 | 12 hours: 1200-1400 |

EXAMPLE 35

Tests with thermal bonding of the laminated specimens prepared in the manner described above.

One of the specimens is applied upon the other and the contact surface is about 10 cm². The resin foils are brought into contact and the junction is subjected to pressure and heating as indicated in Table IV. Perfect adhesion of the specimens is obtained with a separation force as likewise indicated in Table IV.

TABLE IV

| Article prepared according to Example No.: | Thermo-welding Pressure (kg/cm²) | Temperature for Thermowelding (°C.) | Duration of Thermo-welding (seconds) | Separation Force at rupture (kg/cm²) |
|---|---|---|---|---|
| 1 | 44.4 | 210 | 10 | 42-64 |
| 22 | 22.2 | 135 | 20 | 36 |
| 23 | 44.4 | 160 | 20 | 48 |
| 28 | 22.2 | 135 | 20 | 76 |
| 29 | 22.2 | 135 | 20 | 75 |

We claim:

1. The photopolymerizable adhesive which consists of:

| | |
|---|---|
| acrylic acid: | 15% to 88.5% by weight |
| benzophenone: | 0.5% to 10% by weight |
| methyl-ethyl-ketone: | 1% to 60% by weight |
| dimethylamino-ethyl-methacrylate: | 5% to 35% by weight and |
| acrylic amide: | 5% to 35% by weight. |

2. The photohardenable adhesive defined in claim 1 which consists of:

| | |
|---|---|
| acrylic acid | 37% by weight |
| benzophenone | 3% by weight |
| methyl-ethyl-ketone | 15% by weight |
| dimethylamino-ethyl-methacrylate | 20% by weight |
| acrylic amide | 25% by weight |

* * * * *

Dedication 4,295,948.—*Alain Roman*, Bossey; *Pierre Chevreux*, St. Jean de Gonvillo, France; *Manfred Wust*, Dardagny; and *Jacques Ehretsmann*, Conches, Switzerland. PHOTOCURABLE ADHESIVE FROM ACRYLIC ACID, ACRYLAMIDE, DIMETHYLAMINOETHYL METHACRYLATE, BENZOPHENONE AND METHYL ETHYL KETONE. Patent dated Oct. 20, 1981. Dedication filed Mar. 26, 1984, by the assignee, *Battelle Memorial Institute*.

Hereby dedicates to the People of the United States the entire remaining term of said patent.

[*Official Gazette May 15, 1984.*]